United States Patent [19]
Jensen et al.

[11] Patent Number: 5,284,046
[45] Date of Patent: Feb. 8, 1994

[54] MOBILE CALIBRATING APPARATUS FOR CONTROL OF VOLUME METERS FOR LIQUID, ESPECIALLY PROPELLANT PUMPS IN THE TRAFFIC SECTOR

[75] Inventors: Erik Jensen, Taastrup; Jorgen H. Kjeldgaard, Vaerlose; Henrik Blichfeldt, Copenhagen; Michael Engmann, Copenhagen; Flemming Lundh, Copenhagen; Michael Mannstaedt, Allerod, all of Denmark

[73] Assignee: Dantest, Dansk Institut For Proevning OG Justering, Copenhagen, Denmark

[21] Appl. No.: 778,901
[22] PCT Filed: Jul. 6, 1990
[86] PCT No.: PCT/DK90/00176
§ 371 Date: Mar. 11, 1992
§ 102(e) Date: Mar. 11, 1992
[87] PCT Pub. No.: WO91/00988
PCT Pub. Date: Jan. 24, 1991

[30] Foreign Application Priority Data

Jul. 12, 1989 [DK] Denmark ............... 3461/89

[51] Int. Cl.$^5$ ............................................. G01F 25/00
[52] U.S. Cl. .................................................. 73/3
[58] Field of Search ................................ 73/1 H, 3

[56] References Cited

U.S. PATENT DOCUMENTS

| 1,855,502 | 4/1932 | Weymouth | 73/3 |
| 2,050,800 | 8/1936 | Lane et al. | |
| 3,605,481 | 9/1971 | Basler | 73/3 |
| 4,106,328 | 8/1978 | Neeff | 73/3 |
| 4,928,514 | 5/1990 | Beaston | 73/3 |

FOREIGN PATENT DOCUMENTS 268631 12/1912 Fed. Rep. of Germany.

*Primary Examiner*—Robert Raevis
*Attorney, Agent, or Firm*—Kenyon & Kenyon

[57] ABSTRACT

The invention relates to a calibration apparatus for control of propellant pumps, especially in the traffic sector, which apparatus is placed on a vehicle, especially a trailer. The apparatus (1) has at least one standard (10) for measuring a determined amount of propellant, and the standard is placed in a cardan suspension (49-52) which is elastically yielding (48) and may be locked during operation and during transport by means of supporting rods (53-59). A standard (10) is divided into a lower measuring compartment (11) and an upper foam top (14) which is connected tot he measuring compartment (11) through a neck (12) with a measuring glass (13) and reading lines (22). The foam top (14) is ventilated (35-37) to reception tank (5) placed at the bottom of the apparatus (1), and the standard (10) may be connected via a remote controlled discharge valve (20) to the reception tank (5) from which propellant may be pumped up into a buffer tank (64) at the top of the apparatus (1). From here the propellant may be returned to the storage tank of the tank station through a hose (72) either by the aid of gravity or by means of a pump. An electric generator (78) which may be driven by a belt drive (79-84) connected to one of the road wheels (2), may charge an accumulator (87), and a pressure container (88, 89) with a non-flammable pressurized gaz, e.g. carbondioxide, is provided for remote control of the discharge valve (20). A control device for time control of the functions of the apparatus is further provided.

24 Claims, 8 Drawing Sheets

MOBILE CALIBRATING APPARATUS FOR CONTROL OF VOLUME METERS FOR LIQUID, ESPECIALLY PROPELLANT PUMPS IN THE TRAFFIC SECTOR

FIELD OF THE INVENTION

The invention relates to a calibrating apparatus for control of volume meters, especially volume meters for delivering highly inflammable liquids, f. inst. volume meters in the form of propellant pumps in the traffic sector, which calibrating apparatus has at least one standard designed with a determined volume and provided with a filling opening and a discharge opening connected to a reception tank, and in which the standard and the reception tank are placed on a frame provided with wheels, especially a trailer.

BACKGROUND OF THE INVENTION

A society is, both for judicial and fiscal reasons, interested in safeguarding that a citizen while filling propellants into a motor vehicle may receive the correct amount in accordance with the desired or ordered amount.

Earlier types of propellant pumps have been known in which the propellant was pumped by hand from a subterranean storage tank into one or more measuring glasses which each might have contained f. inst. five liters, whereafter the propellant was poured via an adjustable valve through a hose and a filling nozzle down into the tank of the vehicle. It was hereby possible for the citizen or for an inspector appointed for the task to control the correct amount of propellant, as the measuring glass was provided with indicating marks so that the volume might easily be controlled.

However, these types of propellant pumps were slow in operation and the manual pumping demanded a great deal of working power, and the applicability of the propellant pumps therefore declined concurrently with the rising employment of motor vehicles.

Modern propellant pumps therefore are motor driven and are provided with pumps and measuring means which show the amount of propellant delivered.

However, measuring means of this kind may change in accuracy, f. inst. because of wear or impurities, and a citizen normally has no possibility of controlling the amount of propellant delivered, as this is pumped directly into the tank of the vehicle. The possibility available to a citizen to control the amount of propellant delivered would be for he or she to bring along a volume calibrated container, a so called standard, which would be filled up to a certain graduation mark, whereafter the contents of the container would be poured into the tank, f. inst. by lifting the container and pouring the contents through a funnel and a hose.

Considering that a modern private vehicle has a tank of a volume of 40 liters or more, and that a lorry often may have a tank of several hundred liters, such a control would be Utopian to accomplish for the ordinary citizen because the propellant pump would be blocked for a considerable period.

On the other hand this kind of control has been available for an authorized control of petrol pumps, but it cannot live up to the latest requirements on efficiency, environmental care and fire resistance.

It should be remembered that in the authorized control the measured amount of propellant is not bought, so that the propellant collected in the standard is still the property of the owner of the tank, and that the amount of propellant contained in the standard has to be returned to the storage tank of the petrol station through a filling pipe which for reasons of fire prevention is situated at a considerable distance from the propellant pump. The storage tank is normally for the same reasons situated underground and tank stations are provided with several propellant pumps which all have to be controlled.

To achieve the necessary guarantee of a correct verification or calibration of the individual liquid meter in the propellant pump the control of the liquid pump has to be effected by means of several consecutive fillings and emptyings of the standards.

Furthermore the propellant pumps deliver petrol in an amount of typically 60 liters per minute through filling nozzles which are provided with means for automatical stopping of the pumping if a tank is filled or the propellant during the filling "kicks back", and the calibration of the measuring means of the propellant pump presumes a constant flow from the activation of the filling nozzle to the termination of a delivering process. When the propellant leaves the filling nozzle it is mixed with a great deal of air which in connection with the above mentioned rather high pumping speeds results in the formation of foam in the propellant in the standard. This blending with air may be accompanied with an evaporation as a result of the relatively high vapour pressure of the propellant.

To oppose a kickback from the propellant and to be abreast of the foam formation the normal standard is provided with a tall funnel-shaped neck so that the filling nozzle may be kept at a distance above the level which indicates the determined correct charge of the standard, and the standard has to have a volume which corresponds to the lowest legal sales volume, e. g. five liters, and a comparatively broad sole to be able to stand solidly during the filling.

Two liquid indicating glasses, with markings for reading the liquid volume, are placed in diametrically opposite sides of the funnel-shaped neck. Hereby it is possible to calculate a mean value for the readings so that it is possible to compensate for a vertically abberant position of the neck or the longitudinal axis of the standard.

Substantially larger standards are also in existence, e. g. with a volume content of 20 liters.

A filled standard therefore may represent a considerable weight which may be a great disadvantage when it has to be carried from a pump to the filling pipe at the storage tank and when it has to be handled during the emptying.

To ensure uniform conditions during the emptying at several subsequent measurements it is, to counter measuring errors as a result of remnants of propellant left over from previous measurements, common practice to tip the standards and let the propellant flow from the top of the standard till the remnants are leaving the standard drop by drop at intervals of one second, which in practice is based on the time sense of the inspector in question with the resulting inaccuracy of measurement.

The propellant gives off vapours during the filling which partly are unhealthy to inhale and partly represent an element of danger because of their inflammability.

The above described method of control of propellant pumps by means of standards therefore represents a rather large manual task which furthermore is connected with danger of life and health.

To counter these disadvantages a calibration apparatus is known, f. inst. from Norway, of the kind mentioned in the introduction.

In this apparatus a two-wheeled trailer is employed which at front is provided with a coupling arrangement so that the trailer may be connected to and be drawn by a motor vehicle. Several standards of various sizes from the smallest to the largest prescribed size are placed on each side of the trailer. Each of the standards has at the bottom a draining opening which through a short, rigid and transparent hose and a manually operated valve is connected to a reception tank in the bottom of the trailer. The standards have a tall narrow neck which is provided with windows on two diametrically opposite sides, and which windows have engraved measurings lines. The tall narrow necks ensure in a commonly known way that even a small change in the volume of a liquid poured into the standard will result in a large change in the level of the liquid in the narrow neck. The neck of each of the standards is provided at the top with an open funnel which serves to direct liquid into the neck.

The standards are fixed to the trailer and as the surface at the petrol stations is slanting towards a drain with a rather large downward gradient to promote a quick collecting of spilled propellant, the standards may not right away be placed with their longitudinal axes in a vertical position which is a condition for the correct reading of the liquid level in relation to the reading lines of the windows. It will therefore be necessary, as when the traditional loose or free standards are used, to make readings of the two opposite windows or indicating glasses and calculate a mean value. This is a difficult and time-consuming process.

It is possible to supervise through the transparent hose after the manual opening of the draining valve that the propellant flows from the standard down into the collection tank, but it is not possible to ascertain when a uniform amount of liquid residue is left in the standards.

The open funnels involve a risk of spreading of vapours which implies dangers of fire and explosions and environmental hazards. Furthermore, the trailer has to be driven to the filling pipe of the subterranean tank so that the propellant may be emptied into the tank which implies unnecessary driving on the premises of the petrol station, as the filling pipe usually is situated far from the propellant pumps.

SUMMARY OF THE INVENTION

It is the object of the invention to describe an embodiment of a calibration apparatus in which the above mentioned double reading and calculation of the mean at every measurement with a standard is not necessary, the emanation of dangerous vapours is avoided or diminished, the former manual work of returning the measured propellant to the storage tank of a petrol station is replaced with mechanical work, and in which the arrangement is such that modern strict requirements will be complied with, and that the calibrating apparatus will be self-supporting with the necessary energy so that it may be operated independently of external energy.

This object will be achieved by a calibration apparatus of the kind described in the introduction which apparatus according to the invention is characteristic in that the standard or standards are suspended in a lockable cardan suspension, that the connection between the above mentioned discharge opening or each of the discharge openings and the reception tank consists of a flexible discharge hose which is provided with a remote controlled discharge valve, that the standard or each of the standards has a foam top with a cover, which foam top is connected to the reception tank through a ventilation hose, that a buffer tank is placed at the top of the frame and is connected partly to the reception tank through a pipeline provided with pumps and partly to a hose which may be rolled out from a hose drum and which is designed to be connected to a filling pipe on a storage tank in a petrol station; that hydraulic or preferably pneumatic and electric power means are provided in the frame, together with a control device with means for controlling the said pumps and power means and a time controlled remote-control of the discharge valve or valves; that the frame is divided into three sections by fire-resistant bulkheads of which the standard section contains the standard or standards, the tank or pump section contains the reception and buffer tanks, the pumps, the hose drum with the said hose, said power means and an electric generator which is connected to one of the wheels by means of a possibly releaseable driving device, and the electronics section contains the control device and accumulators for collecting the electric power produced by the generator during transport.

By the calibrating apparatus according to the invention a less work demanding execution of the calibration of volume meters in propellant pumps is achieved, and at the same time as the reduction of the manual work a reduction of the fire hazard and an improvement of the environmental conditions is achieved.

The cardan suspension of the standard or standards results in a substantial reduction of the measuring work as in contrast to the known techniques, in which it was necessary to make two readings from opposite sides of the standard and a following calculation of a mean of the readings, which was a great and time consuming task, it is now only necessary to undo the locking to bring the standards or a particular standard into a vertical position within a certain tolerance, after which this position through locking may be fixed during the measurements at one particular propellant pump.

The taking up of the correct position is eased by the emptying being affected through the above mentioned flexible hose which because of its flexibility does not oppose the said movement into a vertical position.

Through the emptying via a remote controlled discharge valve a possibility is achieved of an automatic time control of the emptying of a standard which therefore may be effected by an objectively working device which performs the said emptying in a reproducible way instead of the known way of emptying, which might either be controlled by determining the interval between drops of propellant or by the time sense of the individual operator or by a manual opening and later closing of a manually operated discharge valve.

Emissions of vapours which are dangerous to the environment or represent a hazard of fire or explosions will be reduced to a minimum by the standard or each of the standards being provided with a foam top closeable by a cover and connected to the reception tank by a ventilation hose.

The reception tank is placed low down in the calibration apparatus so that gravitation is employed for emptying the standards which are placed at a higher level than the reception tank, and one must bear in mind that the filling of a standard only takes a lift of the nozzle of the propellant pump to the filling opening of the standard, while it is the pump which delivers the necessary energy for the filling.

Furthermore, the arrangement described of the reception tank, the buffer tank, the pump, conduits and hoses means that the return flow of the measured amount of propellant takes place with the least possible expenditure of energy.

The division of the calibrating apparatus into three zones, which are separated by fire resistant bulkheads guarantees the safety of the operation of the apparatus, as the individual devices may be placed in a zone which corresponds to the vulnerability of the concerned device towards fire or explosions or its ability to emit sparks which may cause fire and/or explosions.

This safety is further enhanced thereby that all vapours may be drained off by means of ventilation hoses so that the vapours will only escape to the open either during the filling proper of a standard in which the cover on the foam top necessarily has to be moved away, or through a pressure equalizating hose which is provided with a flame filter.

Furthermore, the placing of hydraulic or preferably electric power means in the apparatus means that this may be made independent of an external supply of energy whereby the damage to wires for the supply of external energy by being run over by vehicles is avoided, and that the calibration apparatus may be put to use in places without any possibility of finding a supply of external energy.

This internal energy may be produced during the driving of the apparatus because the generator, which is a non-spark-producing generator is coupled to one of the road wheels whereafter the energy is stored in an accumulator in an as such known way, which accumulator preferably is placed in a particular section together with the control device so that the shortest possible wire connections between the two parts are achieved.

Another embodiment of the standard further comprises a measuring compartment below and separated from the foam top by a neck having a window, the measuring compartment and the neck each comprise two cones placed with their apexes turned away from each other and the bases of the cones are connected by a short cylinder, the compartment with the neck has a volume that can be adapted to a predetermined volume by means of a movable, fixable interchangeable displacement body and the foam top has a cover and a volume that at least corresponds to the volume of the compartment. The foam top also has a connection for the ventilation hose in its upper part and the compartment has a displacement opening at its bottom. The standard achieves optimal possibilities that a given change of volume of the propellant in the standard results in the greatest possible change of liquid level in the indicating glass so that this change of volume may be clearly read in relation to the reading lines. This shape also ensures that the foam building is reduced as quickly as possible.

As a result of the cardan suspension, which within a certain tolerance guarantees a vertical position of the longitudinal axis of the standard, it is sufficient to use only one window or indicating glass, while previously known standards have windows or indicating glasses on two opposite sides.

It is possible by means of the movable and lockable, replaceable and as such known displacement body to calibrate the standard to the correct volume.

In another embodiment the standard by flange connections between the neck, the measuring compartment and the foam top and a ring having bearing stubs in diametrically opposite points on the radially outer side is inserted in the flange between the neck and the foam top. These stubs have a common axis and serve as a suspension for the standard. This suspension causes the the distribution of weight of a filled standard will support the tendency of the standard to take up a position in which its axis is placed in a vertical plane.

A further embodiment of this invention comprises a cardan suspension wherein the standard is suspended in bearings in a rectangular frame consisting of angle bars and long beams, which frame extends transversely of the apparatus and at least at one end is supported by a vertical threaded bolt which is mounted immovably in the longitudinal direction in such a way that the supported end may be raised or lowered by turning the bolt and each end of the frame is spring supported by a block of elastomeric material. This suspension is robust, but still permits an easy and fast adaptation to the vertical position of the standards which at the same time, as a result of the elastomeric blocks, will be spring suspended during transport of the apparatus.

Another embodiment of this invention comprises a reception tank designed with relatively large dimensions in the horizontal direction and a limited height and volume and having upper and lower liquid level detectors so that the greatest possible accuracy is guaranteed in subsequent fillings of a standard as the evaporation of propellant in the standard will be subdued by the pressure of the saturated vapours in the ventilation duct and in the reception tank.

A further embodiment of the invention comprises a buffer tank that has a large volume in comparison to the reception tank and a pump having a volume in comparison to the reception tank and a pump having a discharge opening connected to a discharge conduit with a remote controlled shut-off valve and a hose coupling. A conduit loop having a pump is inserted between the discharge opening and a Y-shaped connecting point located between the discharge opening and the shut-off valve and a non-return valve is inserted in the discharge conduit between the discharge opening and the Y-shaped connection point. In this embodiment it may be possible to return the measured amounts of propellant to the storage tank of the tank station by applying the least possible energy consumption.

In a further embodiment of the invention a ventilation conduit connects the reception tank and the buffer tank and one end of a pressure balancing conduit is connected to the top of the buffer tank and the other end has a flame filter so that it is partly ensured that the emptying of the highly placed buffer tank normally is affected only by gravity, and partly that a possible fire in the vicinity of the calibration apparatus will spread to the buffer tank which may contain a considerable amount of propellant.

Another embodiment further comprises expanding brakes on the wheels. The brakes comprise a first pulley peripherally secured to a brake drum, a non-spark forming generator placed in the support frame of the calibrating apparatus, wherein said generator has a second pulley and a drive belt placed around the pulleys so that the generator may be driven during transport thereby charging an accumulator. Energy may therefore be advantageously produced during transport of the apparatus.

A further embodiment of the invention comprises a non-flammable gas compressed into a pressure container and collected through a reduction valve. The gas is preferably nitrogen or carbon dioxide. The compressed gas produces pneumatic energy. Such pressure containers may be procured on an ordinary commercial basis and a full pressure container may be provided quickly in case a pressure vessel is empty.

Another embodiment of the present invention further comprises the control device, the means for controlling the pumps and the power means, and the remote control for the discharge valve interconnected by optical conductors and the necessary electronic optical relays which are preferably placed in the Electronics section. The use of optical conductors for the transfer of signals between the control panels, control panel, control means and detectors is advantageous as the danger connected with the use of electrical wires for transfer of signals in an environment of propellant gases is hereby avoided. The necessary electronic optical relays may advantageously be placed in the electronic sector.

BRIEF DESCRIPTION OF THE DRAWINGS

The calibration apparatus according to the invention will be explained in the following with reference to an embodiment of a mobile calibration apparatus according to the invention as shown in the drawings in which.

DETAILED DESCRIPTION

Figure 1:
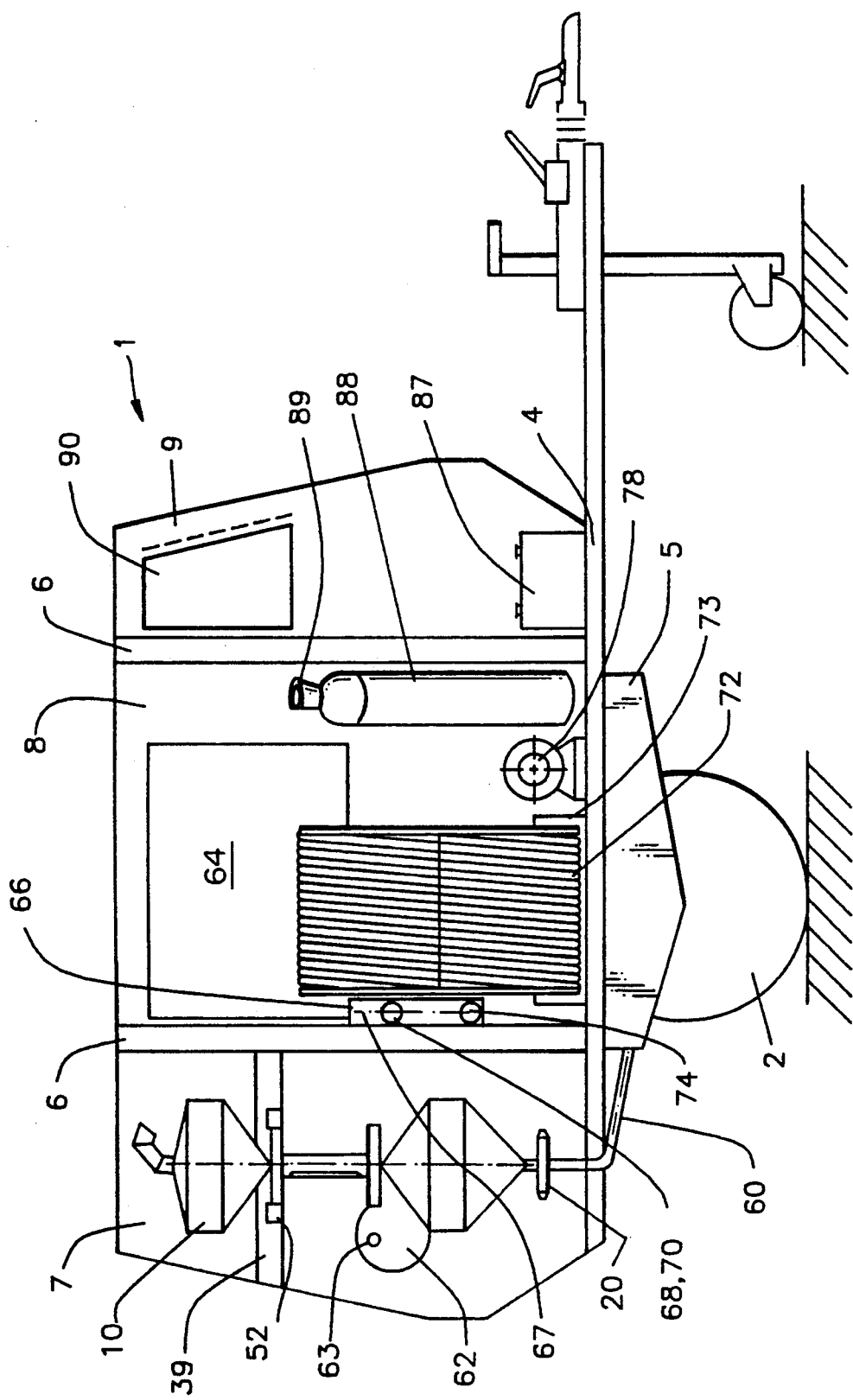
FIG. 1 is a side view of a calibration apparatus according to the invention with certain parts omitted.
Figure 2:
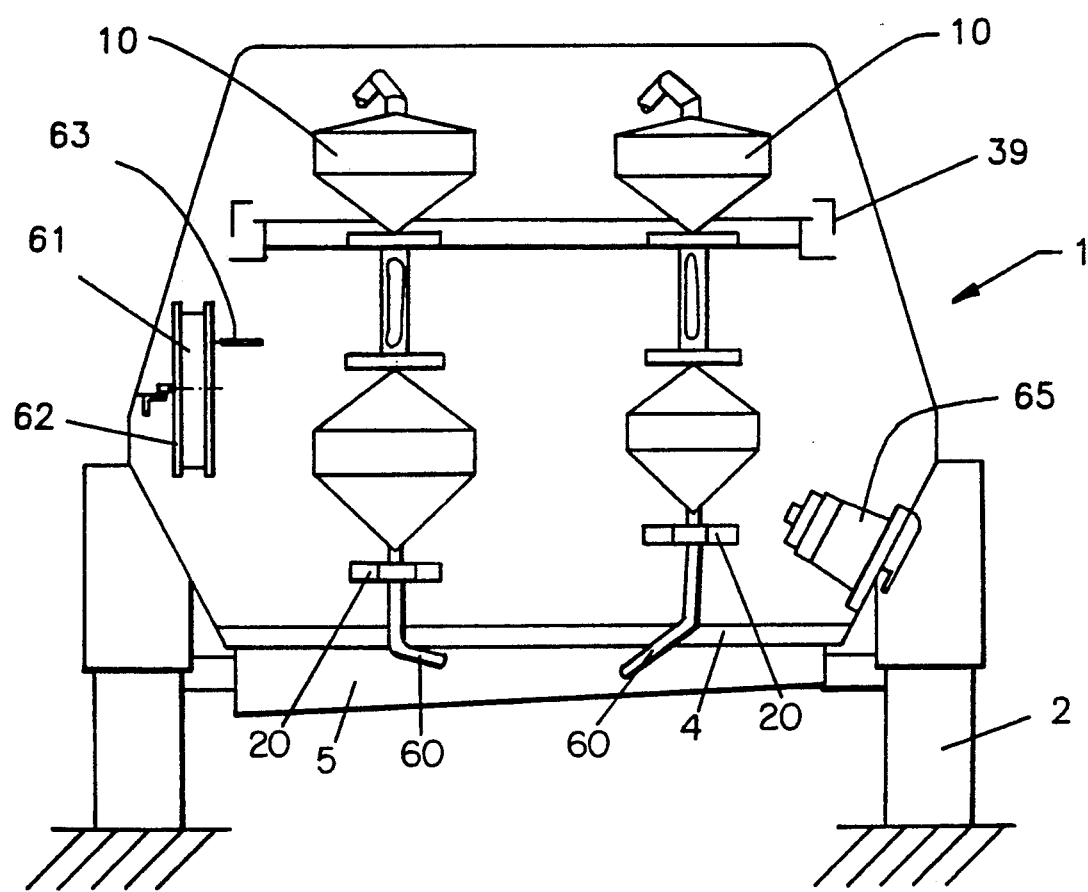
FIG. 2 is a back view of the same apparatus.
Figure 3:
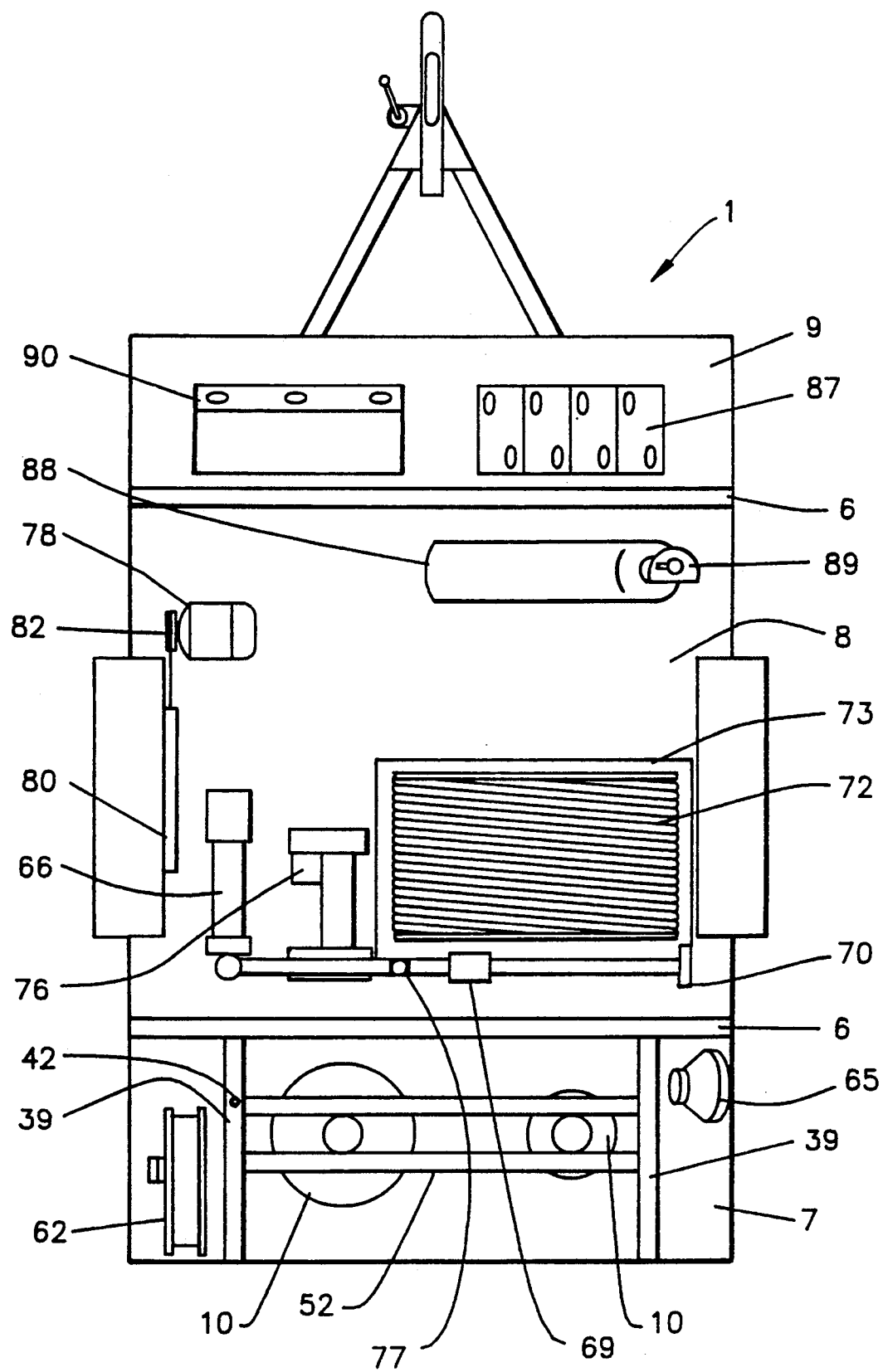
FIG. 3 is a top view of the apparatus with certain parts omitted.
Figure 4:
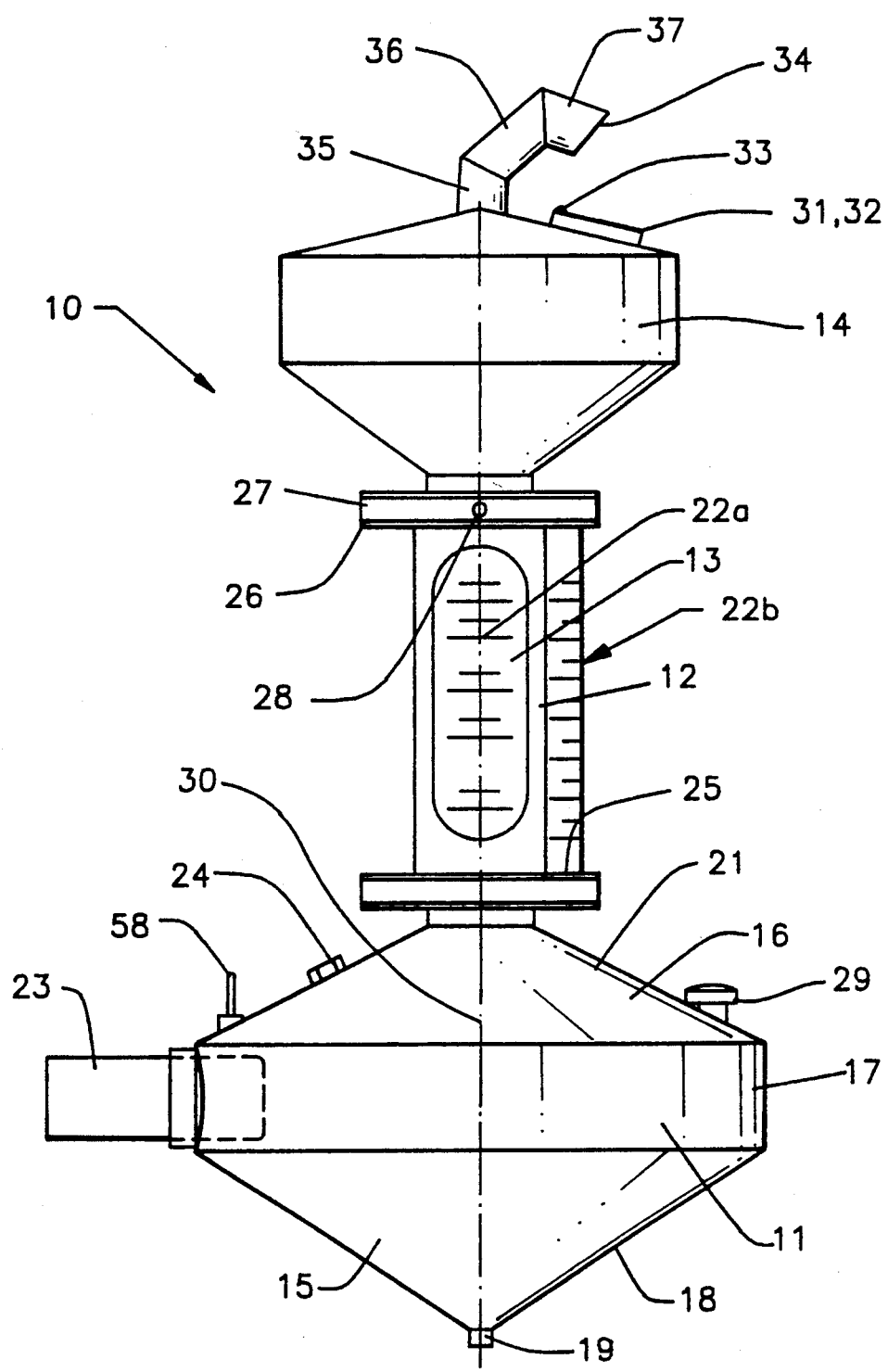
FIG. 4 is a back view of a standard according to the invention.
Figure 5:
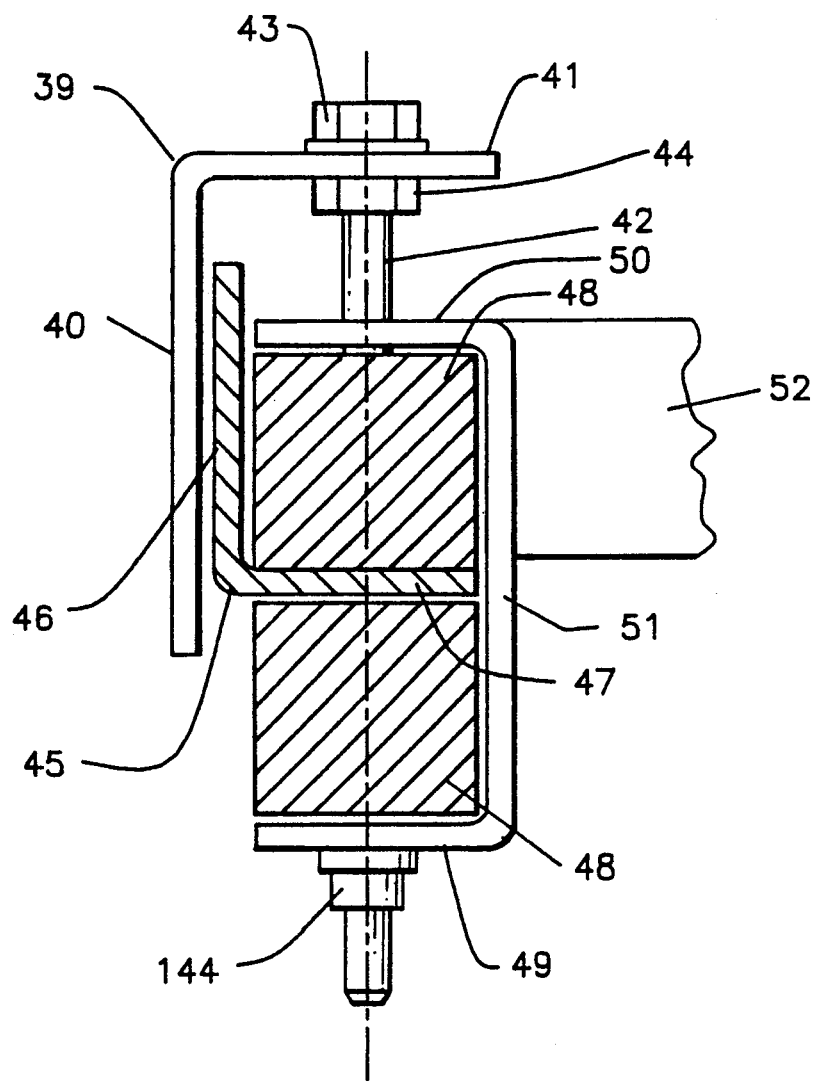
FIG. 5 is a back view of a cardan suspension for the standards.
Figure 6:
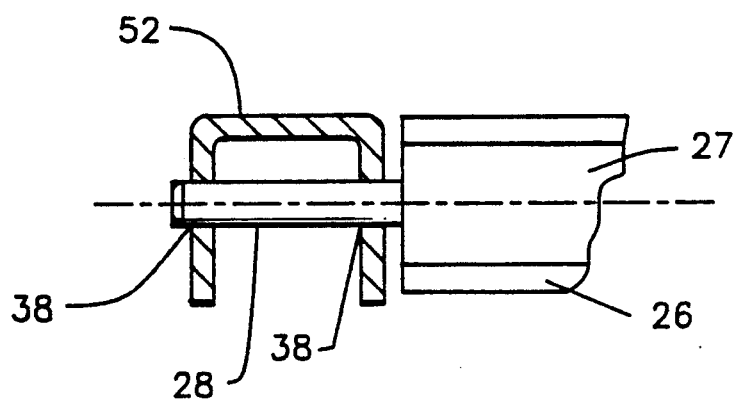
FIG. 6 is a second along the lines VI—VI in FIG. 7.

A calibration apparatus 1 according to the invention is in the shape of a vehicle on road wheels 2, preferably a trailer which may be connected to a hauling vehicle such as a motor car. The trailer may according to requirements be provided with one or more wheel axles 3 with road wheel 2, which wheel axles 3 are mounted on a frame 4 which supports a bottom plate.

A reception tank 5 is placed in the frame 4 between the road wheels 2 which tank has a volume of f. inst. 30 liters and has rather large dimensions in the horizontal plane, but a small vertical extent. The liquid in the reception tank therefore will quickly achieve a large surface so that the left over volume quickly will be filled with saturated vapours for reasons which together with the employment of these saturated vapours will be explained in the following.

Two fire resistant bulkheads 6 are placed on the bottom plate of the frame which bulkheads divide the vehicle 1 into three separate, distinct sections, a standard section 7, a tank or pump section 8 and an electronics section 9.

Two standards 10 are placed in the standard section, f. inst. a 5 liter and a 20 liter standard.

Each standard 10 has at the bottom a measuring compartment 11, in the middle a neck 12 and at the upper end a foam top 14 which together has the shape of a body of revolution which in the position of use of the standard 10 has a vertical axis.

The measuring compartment 11 is constructed of two cones 15, 16 with their apexes turned away from each other and united at their bases by a short cylinder 17. The apex 18 of the downwards turned cone 15 has a discharge opening 19 with a discharge valve 20 and the apex 21 of the upwards turned cone 16 is connected tot he neck 12 which is a comparatively long cylindrical neck with a small cross section. The neck 12 has a window or indicating glass 13 with reading lines 22a either on the glass itself or on an adjacent ruler 22b.

The measuring compartment 11 has a volume which in connection with the volume of the indicating glass is larger than the final volume of a calibrated standard so that it is possible to adjust the volume of the standard by means of displacement bodies 23.

A circular spirit level 29 is placed on the upper side of the measuring compartment 11 which level may show whether the axis 30 of the body of revolution is placed vertically within a given tolerance.

Temperature detectors 24 may further be placed inside the measuring compartment 11 for control of the temperature in the measuring compartment.

The foam top 14 has substantially the same shape as the measuring compartment.

The upper side of the foam top 14 has a filling opening 31 to receive the mouth pipe of a filling nozzle during the filling of the standard with propellant. The volume of the foam top 14 is at least of the same size as the measuring compartment 11 and the volume is moreover adapted in such a way that it may contain both the foam formed by the filling, which is caused by the admixture of air in the propellant from the filling nozzle, as the part of the propellant which cannot pass down to the measuring compartment in time with the pouring. The volume of the foam top 14 is also adjusted so that the highest level of liquid foam will be below the mouth pipe of the filling nozzle and its vacuum pipe, whereby it is avoided that the filling nozzle "cuts out" during the process of filling.

It is important to avoid that the filling nozzle "cuts out" as the volume measuring may only be applicable if the flow of propellant is substantially constant from the activation of the filling nozzle and until the greater part of the volume of the standard has been filled, whereafter the filling may be terminated at a lower velocity of flow until the desired volume has been filled into the standard according to the reading of the propellant pump.

To avoid sources of error such as evaporation of propellant from the standard 10 the filling opening 31 is closed promptly with a cover 32 which f. inst. may revolve on a bolt 33 and be spring loaded towards the closed position of the cover so that the cover 32 takes up its closed position when the filling nozzle is removed from the filling opening and no longer blocks the movement of the cover 32. Besides, a ventilation connection 34 is placed at the upper end of the foam top which connection consists of a first vertical length of pipe 35 which via a slanting upwards extending length of pipe 36 continues into a short downwards extending pipe 37 which is connected to the reception tank 5 through a long flexible hose. The vertical and slanting pipes consists of a transparent material, e.g. PVC, so that it may be controlled that liquid foam is not carried through the ventilation connection and down into the reception tank. The flexible hose is not shown in the drawings for the sake of clarity.

During the emptying of the standard 10 through the discharge valve 20 saturated propellant vapours from the volume above the propellant in the reception tank will be sucked through the ventilation connection 34, whereafter this connected during succeeding fillings of the standard will be filled with saturated vapours so that evaporation during these succeeding fillings will be minimized.

The emptying of a standard takes place through the discharge valve 20 which may be remote controlled through hydraulic or preferably pneumatic means. This operation may be time controlled by electronic means in a control device.

By a time control of this kind a uniform emptying from time to time of a standard 10 is achieved so that the subjective influence of an operator's counting of drops from the last remnants of propellant is avoided.

The connections between the neck 12 and respectively the measuring compartment 11 and the foam top 14 consist of flange connections 25, 26 which permit an easy disassembling and assembling of the separate parts of the standard 10 during reparation and inspection.

A ring 27 is inserted in the flange connection 26 between the foam top 14 and the neck 12 which ring has an opening corresponding to the inside diameter of the neck and on the outside at diametrically opposite points has an outwards extending bearing stud 28 with a circular cross section, which two bearing studs 28 has a common axis. The bearing studs are supported in bearings 38, so that the standard 10 may take up a stable position under the influence of gravity, and enter into a lockable cardan suspension of the standard.

A longitudinally extending side member 39 with a L-shaped cross section is placed on each side at the back of the calibration apparatus at a distance above the frame and parallel herewith, of which member the two flanges are respectively vertical and horizontal; the vertical flanges 40 turned downwards and the horizontal flanges 41 pointing towards each other.

The horizontal flanges 41 are provided with a free hole which accomodates a vertical bolt 52 with a thread which bolts have a hexagonal head 43 so that the bolts may be turned by a key. The bolts 42 are under the horizontal flanges secured by a disk or nut 44 so that the bolts may only be turned in the above mentioned holes and cannot be displaced in the vertical direction.

Only one bolt 42 is shown in each of the said horizontal flanges 41, but two bolts 42 may be employed in each of the horizontal flanges 41.

A short angle bar 45 is placed on the inside of each side member 39 and is slidable in relation to the member. The vertical flange 46 of the angle bar is pointing upwards and the horizontal flange 47 is pointing towards the opposite side of the vehicle.

The horizontal flanges 47 have free holes which accomodate the shafts of the bolts 42.

Blocks 48 of an elastomer such as rubber, foam rubber or similar materials are placed on the upper and under sides of the horizontal flanges 47 of the short angle bars 45. The blocks 48, which also accomodate the bolts 42, are clamped between the flanges 49, 50 of two short bars 51 which has a U-shaped cross section and which are parallel to the above mentioned side members and angle bars 45.

Nuts 144 are welded to the under sides of the flanges 49 which nuts accomodate the bolts 42. It will be understood that by turning the bolts 42 on their longitudinal axes it will be possible both to raise and lower the angle bars 45, the short bars 51 and the elastomer blocks 48 depending of the direction of rotation of the bolts 42.

The two short bars 51 are at their ends connected to the ends of two long beams 52 with U-shaped cross sections so that the angle bars 45 and the long beams 52 together form a rectangular frame with a lengthwise extending opening which is slightly wider than the diameter of the ring 27 with the bearing stubs 28 on a standard 10.

The flanges of the two long beams 52 have holes which serve as bearings for the bearing stubs 28 of the standards of which normally one contains 5 liter and one 20 liter are provided side by side.

It will be obvious to the man skilled in the art that the bearing stubs may as well be situated on the sides of the long beams 52, which are turned towards each other, and be interacting with diametrically opposite bores in the ring 27 in the flange connection 26 between the foam top 14 and the neck 12 of a standard.

By means of the vertical bolts 42 and the rest of the arrangement the necessary posibilities of adjustment are achieved for placing the two long beams 52 level with reference to the unequal distribution of weight which is due to the two unequally heavy standards 10.

The elastomer blocks 48 take up vibrations both during transport and when the pumps are working and prevents propagation of the vibrations to the standards which are empty during transport.

Supporting rods 53–56 are placed in mutually perpendicular directions between the standards 10 and the frame of the calibration apparatus to achieve a locking of the standards 10.

Figure 7:
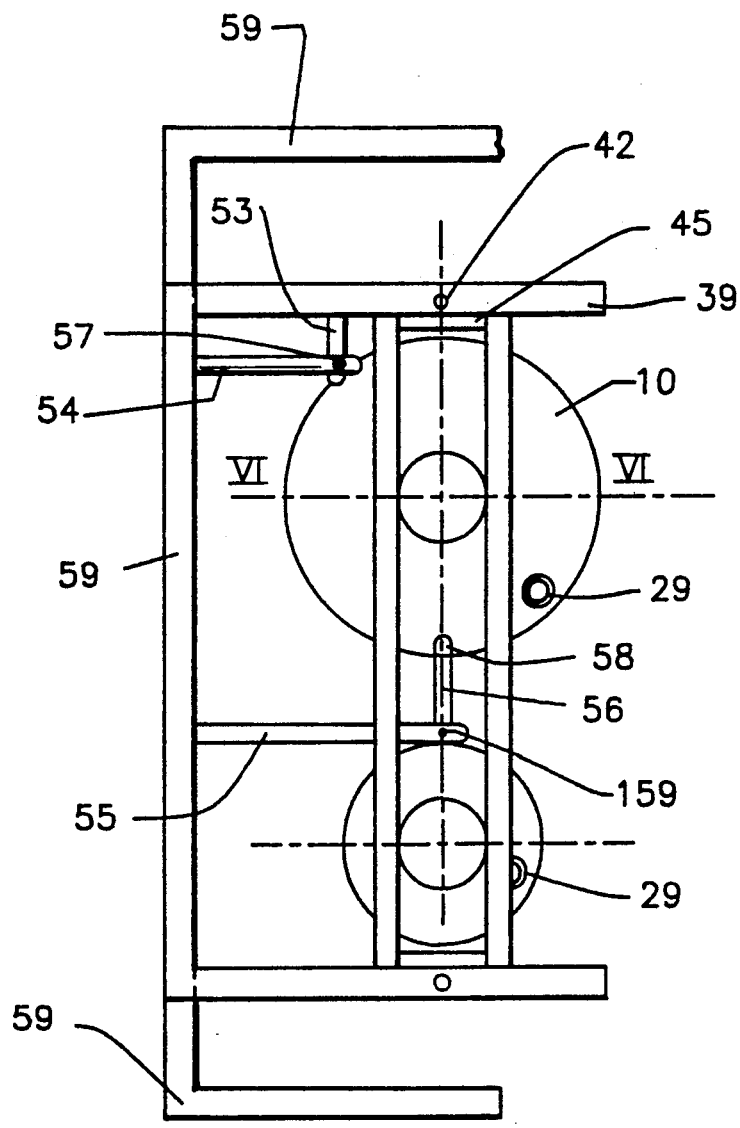
FIG. 7 shows the supporting rods for lockable guidance of the standards.
Figure 8:
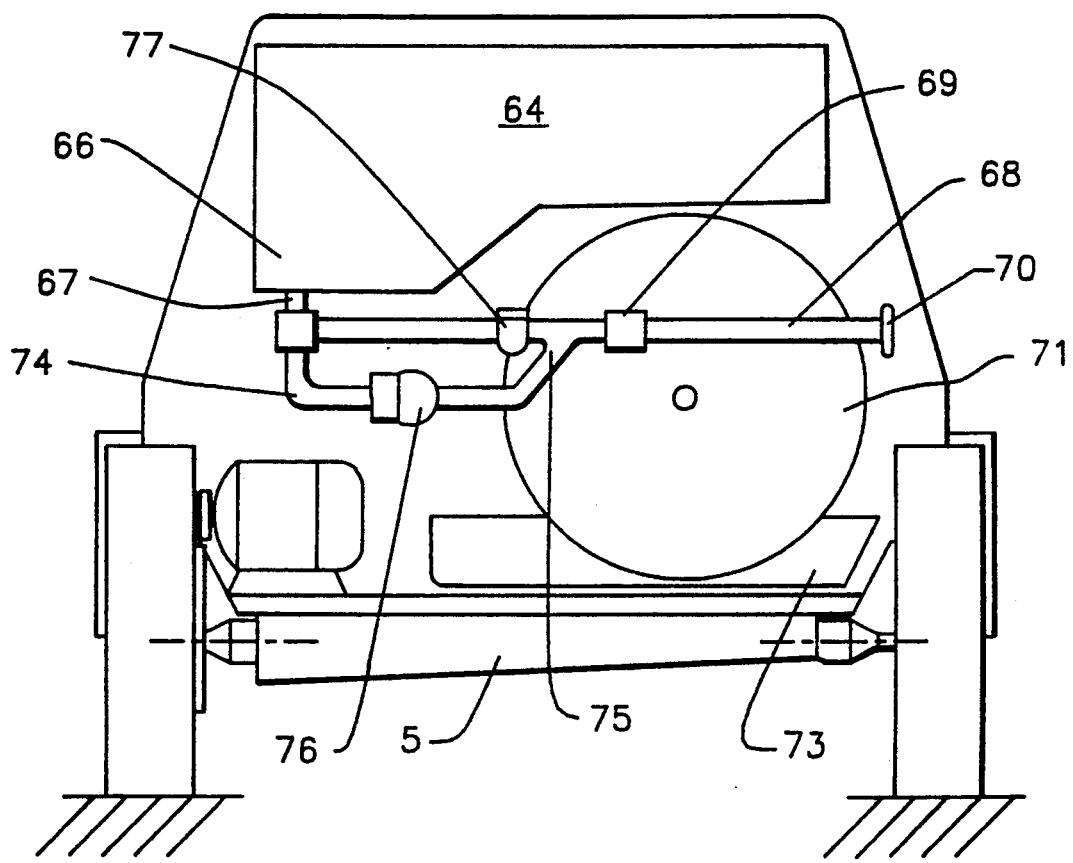
FIG. 8 is a back view of the tank and pump section with a standard section omitted.
Figure 9:
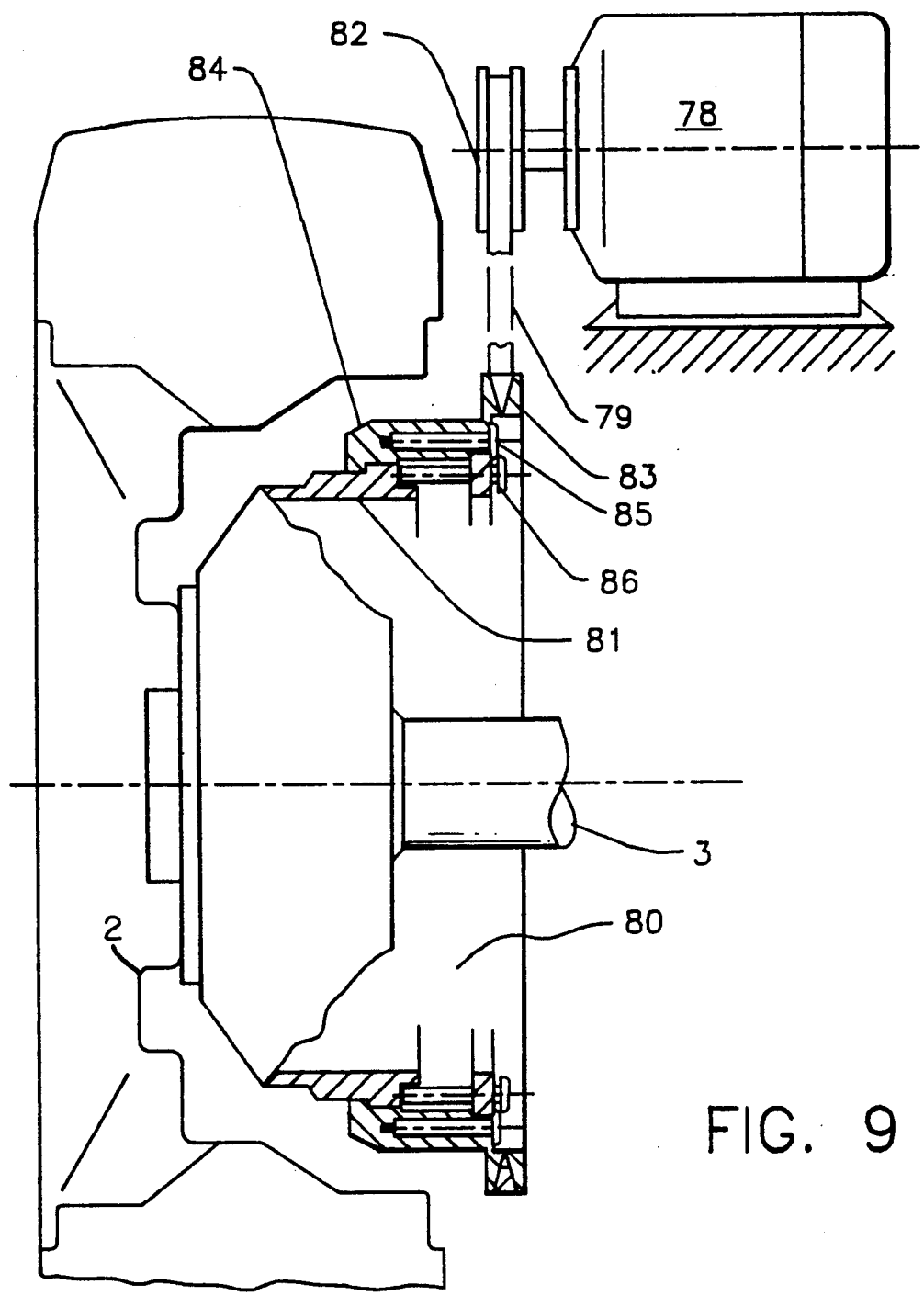
FIG. 9 shows a belt drive between a road wheel and an electricity generator in which only the parts necessary for the understanding are shown.

A first 53 and a second supporting rod 54 are at one end connected by a hinge to a brace 59 which extends around the frame, and at their free and mutually crossing ends have a longitudinally extending slit for the accomodation of a screw 57 which extends upwards from a point at the outside of the measuring compartment of one of the standards, cf. FIG. 7. A third supporting rod 55 is similarly connected by a hinge to the brace 59, and a fourth supporting rod 56 is placed with one end fixedly connected to said standard 10 by means of an additional screw 58. The free and mutually crossing ends of the third and the fourth supporting rods 55, 56 also have a longitudinally extending slit which accomodate a screw 159 fixed at the outside of the second standard 10. The free ends of the supporting bars 53–56 are tightened to the standards by means of wing nuts on the screws.

Before the first filling of the standards the wing nuts are loosened at the supporting rods 53–56 whereafter both standards 10 are filled. When both are full the neck of one of the normals is gripped and moved until the bubble in the circular spirit level 29 shows that the standard 10 is vertical whereafter the wing nut is screwed tight. The procedure is repeated at the other standard. The liquid level may now be read from the reading lines on the liquid indicating glass 13.

Further adjustments of the positions of the standards 10 at the subsequent fillings from the same propellant pump are hereafter unnecessary, as the supporting rods keep the standards in their correct position in the filled conditions, and the elastomer blocks 48 will counterbalance possible movement of the standards during emptying and filling.

The connection between the discharge valve 20 and the reception tank 5 is designed as a flexible connection in the shape of a hose 60 which is corrugated and/or is bent into a U-shape so as not to obstruct the movements of the standards 10 during their filling.

To prevent the formation of sparks by discharge of static electricity in the calibration apparatus 1 a ground lead cable 61 with a clamp, which may be clamped to the ground lead of a propellant pump, is placed in the standard section 7. The ground lead cable 61 is during transport rolled upon a cable drum arranged for this purpose. The cable drum 62 is rotatably supported in the the frame and has a spring system or a handle to rotate the drum on its axis by the rolling out or rolling in of the cable 61.

A buffer tank 64 is placed as high as possible in the tank and pump section 8 which tank has a rather large volume, e. g. 400 liters.

Two detectors are placed in the reception tank 5 at different heights which detectors may register the level of the propellant. When the upper detector is acted upon a signal is sent to a pump which through a pumping tube may pump propellant up into the buffer tank 64, so that the pumping is carried out until a signal from the lower detector again stops the pumping. The detectors, the pump and the pumping tube are not shown in the drawings for the sake of clarity.

As soon as so much propellant flows down into the reception tank 5 from the emptying of the standards 10 that the upper detector is activated, the propellant will be pumped up into the buffer tank 64. The pump stops when the lower detector in the reception tank no longer registers any liquid.

Furthermore, a ventilation conduit for pressure balancing between the tanks 5, 64 and the open is provided between the the reception tank 5 and the buffer tank 64 and a pressure balancing conduit is provided from the buffer tank 64 to the open through a flame filter 65.

The hoses and the ventilation, pressure balancing and pumping conduits consist of material which are resistant towards the chemical environment dominated by the common propellants.

The reception tank 5 and the buffer tank 64 consist of a material which will not cause formation of sparks, such as aluminium, and the tanks are for reasons of strength made of a 3 mm thick plate and have been pressure tested at 0.2 bar.

The buffer tank 64 has a pump 66 with a discharge opening 67. The discharge opening 67 is connected to a discharge conduit 68 which at the end is provided with a remote controlled shut-off valve 69 and a hose coupling 70 to which a hose 72 may be connected. The hose 72 is rolled upon a hose drum 71 and has a length of f. inst. 50 m. Its free end is designed so that it may be connected to the filling pipe of a storage tank.

The hose drum 71 is placed on a tray 73 which may collect any propellant which may drip from the hose 72 and which via a groove in the tray 73 may drain to the road surface.

The discharge opening 67 is further connected to a conduit loop 74 the other end of which is connected to the discharge conduit 68 at a Y-shaped connecting point 75 between the discharge opening 67 and the shut-off valve 69. A pump 76 is inserted in the conduit loop 74 which pump may pump propellant from the discharge opening 67 through the shut-off valve 69, the hose coupling 70 and the above mentioned hose 72 into the storage tank.

Furthermore, a non-return valve 77 is inserted in the discharge conduit between the discharge opening 67 and the above mentioned connecting point 75.

The emptying of the buffer tank normally takes place as a flow under the influence of gravity through the discharge conduit 68, the non-return valve 77, the shut-off valve 69, the hose coupling 70 and the rolled out hose 72 when the free end of this hose is connected to the filling pipe of a storage tank in the tank station after the opening of the shut-off valve 69.

However, a detector is also placed at the top of the buffer tank 64 which detector at a high level of propellant may send a signal to the pump 76 in the conduit loop 74 to start pumping propellant through the shut-off valve 69, the hose coupling 70 and the hose 72 to the filling pipe, and during this pumping, which serves to prevent propellant leaving the buffer tank 64 through the ventilation conduit and the flame filter 65, the non-return valve 77 closes and the Y-shaped connecting point 75 simultaneously functions as ejector.

In rare cases, when the distance between the calibration apparatus 1 and the filling pipe is in excess of the length of the hose 72, the shut-off valve 69 has to be closed and the buffer tank 64 used as a provisional reception tank until the vehicle may be driven to the filling pipe to be emptied.

The tank and pump section 8 also contain power means to produce the necessary power for operating the discharge valves 20 of the standards 10 and for pumping propellant between the reception tank 5 and the buffer tank 64 and possibly from the buffer tank 64 to the filling pipe of the tank station.

For this purpose an electric generator 78 is placed in the frame 4 which generator is connected to one of the road wheels 2 through a belt drive 79, which preferably may be a V-belt drive.

The belt drive 79 comprises a first pulley 80, which is mounted on an existing brake drum 81 on the said road wheel 2, and a second pulley 82 on the axle of the generator 78.

The first pulley 80 consists of two rings 83, 84 which may be clamped together around the brake drum 81 the circumference of which has to be prepared in a suitable way. The rings 83, 84 are assembled by means of screw 85. To secure the rings 83, 84 against turning on the brake drum 81 bolts 86 are screwed through threaded holes in the axially innermost ring 83 against the brake drum 81.

During transport of the calibration apparatus 1 the generator 78 is driven and thereby delivers electrical power for charging an accumulator 87 through charging devices of the kind commonly found in ordinary automobiles, which charging devices guarantees that the charging current will be adapted to the state of charge of the accumulator 87, so that the accumulator 87 is charged with the strongest permissible charging current if it is discharged, and correspondingly lets the generator deliver a no-load current if the accumulator is fully charged.

The accumulator 87 is for reasons of safety and fire prevention placed in the electronics sector 9.

The described embodiment of the tank and pump arrangement as well as the placing of a belt driven electrical generator 78 at one of the road wheels 2 is connected to the conditions under which the propellant has to be conveyed back to a storage tank in a tank station and the energy consumption which is necessary for this process.

As the filling pipes at the storage tanks of a tank station are placed remote from the propellant pumps with the volume meters which are to be controlled. The return transfer of the measured amounts of propellant is cumbersome.

It would be possible to let the propellant from a pump flow into a reception tank of c. 200–300 liter in the calibration apparatus and after that drive the apparatus to the emptying place, but this is a time and work consuming activity during which it will not be possible to undertake any calibrations at a pump.

It has therefore been decided to draw a hose 72 from the calibration apparatus 1 at its stand to the filling pipe of the storage tank.

Experiments have shown that it takes considerably more pumping work to pump a certain amount of liquid through 50 meters of hose without any difference in level than to let the same pump lift the same amount 1 meter and afterwards letting the amount of liquid flow the same length of hose through free fall.

After having been pumped from the reception tank 5 up to the buffer tank 64 the amount of propellant flows slowly by the influence of gravity through the hose 72 to the filling pipe of the tank station. The pump has to pump for c. 4 minutes to pump the amount needed for a calibration of a propellant pump whereafter it takes about half an hour for this amount to flow by free fall through 50 meters of hose 72 from the buffer tank 64. If the same pump had to pump the same amount of propellant through the same length of hose, but without any differences in level, it would demand twice the time for pumping and thereby twice the amount of energy.

Energy is therefore saved by using a reception tank 5 and a buffer tank 64 at two different levels. Excess time is demanded to achieve this saving in energy, but, as the time of stay at a propellant pump also is about half an hour during which, in addition to the brief fillings of the standards, adjustments of the suspensions and readings and recordings of the results have to take place, this appears to be acceptable.

If the hose 72 should be run over, the flow of propellant through the hose will only be stopped as long as the hose is compressed independent of whether this compression takes a short or a long time.

If a solution had been chosen in which pumping was effected directly from a reception tank to a filling pipe then the pump would have to work under pressure during a long term compression of the hose, if f. inst. a vehicle inadvertently stopped with a wheel on the hose. This might cause an overheating of the the pump which might be dangerous in an environment of propellant vapours.

It is true that the buffer tank 64 at times may be discharged by pumping through the above mentioned conduit loop 74, but this pumping is only done for a short time to prevent propellant from leaving the calibration apparatus through the ventilation hose and flow through the flame filter 65.

The necessary energy for pumping back the propellant has to be provided by the calibration apparatus 1 itself as it is too risky to collect energy for the calibration apparatus from the energy supply of the tank station through cables because the cables might be run over with a risk of destruction and the consequence of spark formation in an environment in which drifting vapours of propellant may occur on the road surface.

The necessary energy is provided through the generator 78 and the accumulator 87 in the shape of electric current whereby the calibration apparatus is made into a self-sufficient system which may be used under all sorts of circumstances.

Calibration of isolated unmanned pumps, at which there is no possibility of external electricity supply, is in this way made possible.

If a hydraulically operated discharge valve 20 is used with a standard 10 the necessary hydraulic equipment must be placed in the tank and pump section 8 together with a hydraulic pump which may be driven by the accumulator.

However, the hydraulic equipment needs quite a large amount of power during the operation and if this power had to be provided in the shape of electricity, this might represent a danger of spark formation, and it is therefore preferred to use pneumatic energy which may be provided in the shape of a suitable fire preventing gas which is compressed into a pressure container 88. Suitable gasses may be nitrogen or carbondioxide.

The gas is supplied from one or several pressure containers 88 through a reduction valve 89 of an as such known kind so that the gas may be collected at a suitable pressure and supplied to the activating means at the discharge valves 20.

A control panel 90 and the accumulator 87 are placed in the electronics section as these parts represent the greatest risk of spark formation.

The control panel 90 contains electronic means for time control of the discharge valves 20 of the standards 10, start and stop of the electrically driven pumps, which partly pump propellant from the reception tank tank 5 to the buffer tank 64, and partly from the buffer tank 64 through the branch conduit 74 to the hose 72 and the filling pipe of the tank station, when there is a need for operation of the last mentioned pump 76, opening and closing of the shut-off valve 69, and regulation of the charging of the accumulator 87 by the generator 78.

The electronic means in the control device also comprise alarm systems which acustically and/or visually may announce possible malfunctions of the calibrating apparatus.

The control buttons for control of the individual functions may be placed in the control panel 90, but the control buttons are preferably placed in a special panel in the standard section 7 so that an operator may operate all functions in the calibration apparatus 1 from one and the same stand at the end of the standard section 7.

The necessary conduits and cable connections are passed through the fire-resistant bulkheads by means of packings which may withstand any fire which may break out in a section so that a fire may be limited to this section.

The use of electric wires for transfer of signals between the control panel 90 and various means in the calibration apparatus implies a danger of spark formation which might ignite the vapours of propellant in and around the apparatus. It is therefore preferred to use optical conductors for the transfer of signals to the widest possible extent.

The necessary electronic optical relays are to the widest possible extent placed in the electronics sector 9.

The calibration apparatus 1 is, to achieve a protection against the weather and for reasons of safety, covered by a roof and doors and/or roll-fronts which permit the attendance of the apparatus. Besides, the apparatus in its entirety is lockable.

Both the bottom and the doors have ventilation openings to maintain the best possible conditions so that any remnants of propellant, which may have dripped off, may evaporate and be carried off by the wind during transport of the calibrating apparatus from one tank station to another.

We claim:

1. A calibrating apparatus for control of volume meters comprising,
   a support frame having a plurality of wheels,
   a reception tank located in said support frame,
   at least one standard suspended in said support frame in a lockable cardan suspension and having a determined volume, a filling opening, a discharge opening connected by a flexible discharge hose and a remote controlled discharge valve to the reception tank placed below the standard and a foam top with a cover connected to the reception tank by a ventilation hose,
   a buffer tank place at top of said support frame and connected partially to the reception tank by a pipeline having at least one pump and partially to a hose rolled from a hose drum for connection to a filling pipe on a storage tank in a petrol station,
   hydraulic and electric power means,
   control means for controlling the pump, the power means and the remote control discharge valve,
   an electric generator connected to one of said wheels by a releasable driving device, and
   an accumulator charged by said generator through charging devices wherein said power means, said control means, said generator and said accumulator is located in said support frame remote from said standard.

2. The calibrating apparatus of claim 1, wherein said support frame is divided into three sections by fire resistant bulkheads, a first section containing said standard, a second section containing said reception tank, said buffer tank, said pump, said hose drum with said hose, said power means and said electric generator, and a third section containing said control means and said plurality of accumulators.

3. The calibrating apparatus of claim 2, wherein the volume meters are for delivering highly inflammable liquids.

4. The calibrating apparatus of claim 2, wherein the volume meters are propellant pumps in the traffic sector.

5. The calibrating apparatus of claim 2, wherein said support frame is a trailer.

6. The calibrating apparatus of claim 2, wherein said hydraulic and electric power means is pneumatic.

7. The calibrating apparatus of claim 6, wherein said pneumatic power means further comprises a non flammable gas compressed into a pressure container and collected through a reduction valve.

8. The calibrating apparatus of claim 2, wherein said standard is a hollow body of revolution further comprising a measuring compartment below said foam top, a slender neck with a window between said foam top and said measuring compartment, said measuring compartment and said foam top each comprise two cones having apexes turned away from each other and bases connected by a short cylinder, said measuring compartment having a volume that may be adapted to a predetermined volume by a movable, fixable and interchangeable displacement body, said foam top having a volume substantially equal to or greater than the volume of said measuring device and a means for closing said cover over the filling opening, and said discharge opening is located at bottom of said measuring compartment.

9. The calibrating apparatus of claim 8, wherein said window is a measuring glass having measuring lines on the glass.

10. The calibrating apparatus of claim 8, wherein a ruler is placed adjacent to said window.

11. The calibrating apparatus of claim 8, wherein said cover is spring loaded.

12. The calibrating apparatus of claim 8, further comprising a first flange connecting a first end of said neck to the measuring compartment, a second flange connecting a second end of said neck to the foam top, and a ring inserted in said second flange having two bearing stubs supported in bearings located at diametrically opposite points on the outside of said ring serving as a suspension for said standard.

13. The calibrating apparatus of claim 12, wherein said cardan suspension further comprises a rectangular frame.

14. The calibrating apparatus of claim 13, wherein said rectangular frame comprises
   a plurality of long beams having a U-shaped cross section and holes for receiving said bearing stubs,
   a plurality of angle beams, having a horizontal flange and a vertical flange, connected to ends of said long beams so that said rectangular frame is formed having a lengthwise opening for receiving said ring,
   two L-shaped members, having a horizontal flange and a vertical flange, placed on each side of said apparatus and slidably mounted against said angle beams,
   a short bar having two flanges parallel to said horizontal flange of said angle beam and said horizontal flange of said L-shaped member,
   two elastomer blocks, supporting each end of said rectangular frame, placed above and below said horizontal flange of said angle bar and within said short bar, and
   an immovably mounted vertical threaded bolt supporting one end of said rectangular frame and extending through all of said flanges so that one end of the frame is raised or lowered by turning said bolt.

15. The calibrating apparatus of claim 12, wherein said reception tank has a horizontal dimension relatively larger then its height and volume dimensions.

16. The calibrating apparatus of claim 12, wherein said reception tank further comprises an upper detector and a lower detector for detecting liquid level.

17. The calibrating apparatus of claim 12, wherein said at least one pump further comprises,
   a discharge opening connected to a discharge conduit having a remote control shut-off valve and a hose coupling at an end remote from the discharge opening for connection to said hose,
   a conduit loop, having a second pump, attached to said discharge conduit between said discharge opening and said remote control shut-off valve at a connection point, and a non-return valve inserted in the discharge conduit between the discharge opening and the connection point of the discharge conduit and the loop conduit.

18. The calibrating apparatus of claim 17, further comprising a ventilation conduit connecting said reception tank and said buffer tank.

19. The calibrating apparatus of claim 2, wherein said wheels further comprise expanding brakes having brake drums.

20. The calibrating apparatus of claim 19, further comprising, a first pulley secured to one of said brake drums, said generator is located in said second section of said support frame having a second pulley, and a drive belt placed around said first and second pulleys so that said generator is driven during transport and said accumulator is charged.

21. The calibrating apparatus of claim 20, wherein said drive belt is a V-belt.

22. The calibrating apparatus of claims 20, wherein said generator is non-spark forming.

23. The calibrating apparatus of claim 1, further comprising optical conductors having optical relays for connecting said control means to said pump, said power means and said remote control discharge means, wherein said optical relays are in the third section of said support means.

24. The calibrating apparatus of claims 1, wherein said generator is non-spark forming.

* * * * *